US011151631B2

(12) United States Patent
Modaresi et al.

(10) Patent No.: US 11,151,631 B2
(45) Date of Patent: Oct. 19, 2021

(54) QUICK LEARNING RECOMMENDATION METHOD, NON-TRANSITORY COMPUTER READABLE MEDIUM AND SYSTEM FOR BASKETS OF GOODS

(71) Applicant: ORACLE INTERNATIONAL CORPORATION, Redwood Shores, CA (US)

(72) Inventors: Sajad Modaresi, Durham, NC (US); Fernando Bernstein, Durham, NC (US); Denis Saure, Durham, NC (US); Setareh Borjian Boroujeni, Burlington, MA (US); Su-Ming Wu, Waltham, MA (US); Robert Corr, Winchester, MA (US); Nikos Nikolakis, Winchester, MA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 230 days.

(21) Appl. No.: 15/955,054

(22) Filed: Apr. 17, 2018

(65) Prior Publication Data
US 2019/0318410 A1    Oct. 17, 2019

(51) Int. Cl.
G06Q 30/00    (2012.01)
G06Q 30/06    (2012.01)
G06N 20/00    (2019.01)

(52) U.S. Cl.
CPC ......... *G06Q 30/0631* (2013.01); *G06N 20/00* (2019.01)

(58) Field of Classification Search
CPC ..................................... G06Q 30/0601–06045
(Continued)

(56) References Cited

U.S. PATENT DOCUMENTS 7,680,703 B1 * 3/2010 Smith .................... G06Q 10/06
                                                              705/26.8
2004/0172237 A1    9/2004 Saldanha et al.
(Continued)

OTHER PUBLICATIONS

Reverdy, P. B. (2014). Human-inspired algorithms for search A framework for human-machine multi-armed bandit problems (Order No. 3642141). Available from ProQuest Dissertations and Theses Professional. (1629828759). Retrieved from http://dialog.proquest.com/professional/docview (Year: 2014).*
(Continued)

*Primary Examiner* — Marissa Thein
*Assistant Examiner* — Ashley D Preston
(74) *Attorney, Agent, or Firm* — Potomac Law Group, PLLC (57) ABSTRACT

Embodiments provide a recommendation for an additional item in response to receiving a basket of goods determine a type for the basket of goods from a set of basket types, receive a set of additional targeted items as target recommendations and receive a history of received types of baskets of goods. Embodiments iteratively perform a clustering into a plurality of clusters of each of the basket types based on the history of received types of baskets of goods, and preference updating for each of the targeted items into each of the plurality of clusters. The iteratively performing, after a plurality of iterations, outputs a sequence of mappings and a sequence of preference parameters. Embodiments generate a frequency of tabulation of mappings from the sequence of mappings and then generate the recommendation based on the sequence of mappings, the sequence of preference parameters and the frequency of tabulation of mappings.

20 Claims, 6 Drawing Sheets

(58) Field of Classification Search
USPC .............................................. 705/26.1–27.2
See application file for complete search history.

(56) References Cited

U.S. PATENT DOCUMENTS

| | | |
|---|---|---|
| 2006/0069503 A1 | 3/2006 | Suomela et al. |
| 2013/0191377 A1 | 7/2013 | Zelevinsky et al. |
| 2014/0006205 A1* | 1/2014 | Berry ................. G06Q 30/0641 |
| | | 705/26.7 |
| 2016/0063566 A1* | 3/2016 | Nagarathinam ... G06Q 30/0269 |
| | | 705/14.45 |
| 2017/0091319 A1* | 3/2017 | Legrand ................. G06Q 30/00 |
| 2019/0197575 A1* | 6/2019 | Ladds ................. G06Q 30/0233 |

OTHER PUBLICATIONS

Xu, Y. (2009). Examining the effects of bundling strategies on travelers' value perception and purchase intention of a vacation package (Order No. DP19382). Available from ABI/INFORM Collection. (1027149566). Retrieved from https://search.proquest.com/docview/1027149566?accountid=14753 (Year: 2009).*

Broden et al., "Ensemble Recommentations via Thompson Sampling", Intelligent User Interfaces, ACM, Mar. 5, 2018, pp. 19-29.

International Search Report that issued in the corresponding International Application No. PCT/US2019/021024, dated Jun. 5, 2019.

Saure, D. and Zeevi, A., "Optimal dynamic assortment planning with demand learning", Manufacturing Service Oper. Management 15(3), 387-404 (2013).

* cited by examiner

QUICK LEARNING RECOMMENDATION METHOD, NON-TRANSITORY COMPUTER READABLE MEDIUM AND SYSTEM FOR BASKETS OF GOODS

FIELD

One embodiment is directed generally to a computer system that provides recommendations, and in particular to a computer system that provides recommendations suitable for rapidly changing offerings.

BACKGROUND INFORMATION

It has become increasingly common for online retailers to use "recommender systems," which are systems that make recommendations of items to customers based on a customer's purchasing history and the purchasing history of all other customers. Such systems are relatively less common in the restaurant or hotel industry, where recommendations are frequently made by ad hoc means, such as using human intuition rather than a systematic software algorithmic approach that analyzes customers' purchases.

Even when a software approach is employed, it may suffer from being too slow to adapt to changing offerings and changing customer mix and preferences. In the restaurant industry, it is possible to make a historical examination of which items were purchased in the same order, and from such an examination produce recommendations. However, such recommendations are static if the examination of history is infrequent, perhaps due to its cost. Even if the examination of history is frequent, known systems are still slow to adapt because of the amount of new data that must come in before the system can alter its recommendations.

SUMMARY

Embodiments provide a recommendation for an additional item in response to receiving a basket of goods. Embodiments determine a type for the basket of goods from a set of basket types, receive a set of additional targeted items as target recommendations and receive a history of received types of baskets of goods. Embodiments iteratively perform a clustering into a plurality of clusters of each of the basket types based on the history of received types of baskets of goods, and preference updating for each of the targeted items into each of the plurality of clusters. The iteratively performing, after a plurality of iterations, outputs a sequence of mappings and a sequence of preference parameters. Embodiments generate a frequency of tabulation of mappings from the sequence of mappings and then generate the recommendation based on the sequence of mappings, the sequence of preference parameters and the frequency of tabulation of mappings.

DETAILED DESCRIPTION

One embodiment is a system that analyzes an entire basket of goods and services purchased by a customer in a single visit to a restaurant or hotel, and based on the analysis, recommends additional goods and services based on the content of the basket. Embodiments minimize the amount of historical data needed to make a recommendation, thus increasing the speed of decisions.

Figure 1:
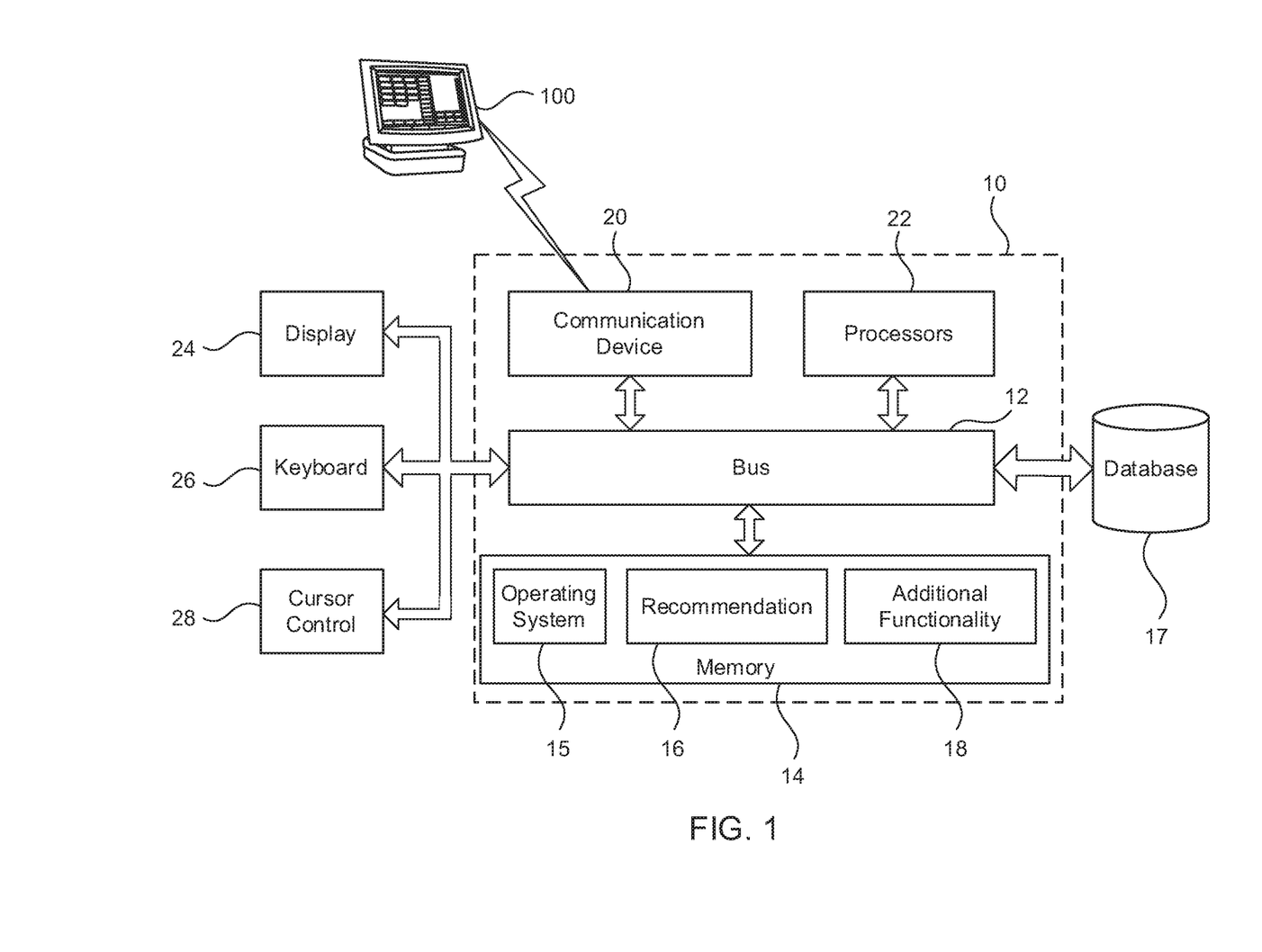
FIG. 1 is a block diagram of a computer server/system in accordance with embodiments that can implement any of the disclosed components herein.

FIG. 1 is a block diagram of a computer server/system 10 in accordance with an embodiment of the present invention. Although shown as a single system, the functionality of system 10 can be implemented as a distributed system. Further, the functionality disclosed herein can be implemented on separate servers or devices that may be coupled together over a network. Further, one or more components of system 10 may not be included. For example, for functionality of a server, system 10 may need to include a processor and memory, but may not include one or more of the other components shown in FIG. 1, such as a keyboard or display.

System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network, or any other method.

Computer readable media may be any available media that can be accessed by processor 22 and includes both volatile and nonvolatile media, removable and non-removable media, and communication media. Communication media may include computer readable instructions, data structures, program modules, or other data in a modulated data signal such as a carrier wave or other transport mechanism, and includes any information delivery media.

Processor 22 is further coupled via bus 12 to a display 24, such as a Liquid Crystal Display ("LCD"). A keyboard 26 and a cursor control device 28, such as a computer mouse, are further coupled to bus 12 to enable a user to interface with system 10.

In one embodiment, memory 14 stores software modules that provide functionality when executed by processor 22. The modules include an operating system 15 that provides operating system functionality for system 10. The modules further include a recommendation module 16 that recommends additional goods and services based on a basket of goods or services, and all other functionality disclosed herein. System 10 can be part of a larger system. Therefore, system 10 can include one or more additional functional modules 18 to include the additional functionality, such as the "Hospitality Simphony" point of sale ("POS") cloud and mobile hospitality management platform from Oracle Corp. A database 17 is coupled to bus 12 to provide centralized storage for modules 16 and 18 and store customer data, product data, transactional data, etc. In one embodiment, database 17 is a relational database management system ("RDBMS") that can use Structured Query Language ("SQL") to manage the stored data. In one embodiment, a specialized point of sale ("POS") terminal 100 functions as a client device that allows a user to make selections and receive recommendations using a user interface. POS terminal 100 is coupled to the remainder of system 10 through any communication means, including wired or wireless or via additional networks such as the Internet. POS terminal 100 itself can perform some or all of the functionality disclosed herein, and includes its own processor, memory, etc.

In one embodiment, particularly when there are a large number of restaurants; hotels, a large number of items, and a large amount of historical data, database 17 is implemented as an in-memory database ("IMDB"). An IMDB is a database management system that primarily relies on main memory for computer data storage. It is contrasted with database management systems that employ a disk storage mechanism. Main memory databases are faster than disk-optimized databases because disk access is slower than memory access, the internal optimization algorithms are simpler and execute fewer CPU instructions. Accessing data in memory eliminates seek time when querying the data, which provides faster and more predictable performance than disk.

In one embodiment, database 17, when implemented as a IMDB, is implemented based on a distributed data grid. A distributed data grid is a system in which a collection of computer servers work together in one or more clusters to manage information and related operations, such as computations, within a distributed or clustered environment. A distributed data grid can be used to manage application objects and data that are shared across the servers. A distributed data grid provides low response time, high throughput, predictable scalability, continuous availability, and information reliability. In particular examples, distributed data grids, such as, e.g., the "Oracle Coherence" data grid from Oracle Corp., store information in-memory to achieve higher performance, and employ redundancy in keeping copies of that information synchronized across multiple servers, thus ensuring resiliency of the system and continued availability of the data in the event of failure of a server.

In one embodiment, system 10 is a computing/data processing system including an application or collection of distributed applications for enterprise organizations, and may also implement logistics, manufacturing, and inventory management functionality. The applications and computing system 10 may be configured to operate with or be implemented as a cloud-based networking system, a software-as-a-service ("SaaS") architecture, or other type of computing solution.

In general, the examination of historical transactions, as is done by many known recommendation systems, may also be overly simplistic in that known systems generally examine only pairs of items that occur together in an order, referred to as Association Rule Mining ("ARM"). Instead, as with embodiments of the invention, the set of ALL items in the order taken together is a better indicator of the type of the order or type of the individual placing the order, and using this additional information could lead to better and more accurate recommendations. Further, known systems that use ARM typically do not account for any demographic information about customers, which can also be used to improve recommendations.

Further, as specifically related to recommendation for restaurants, offerings change frequently in restaurants, and these changes can have a much larger effect than such changes in retail, where the number of offerings is vastly greater than in restaurants. For example, assortments in grocers do change frequently, but because a typical grocer might carry 60,000 stock keeping units ("SKUs"), any one assortment change is likely to have a relatively small overall effect on total sales. In contrast, a restaurant may offer only a few hundred different items, and if recommendations focus on just one type of item, such as an entrée, then the recommendations may be limited to only a few dozen. Adding a new entrée is likely to have a significant effect on customers, and known recommendation systems generally are not able to adapt to the effect quickly enough.

Further, online retailers generally use recommendation systems which employ "customer-linked transactions," meaning tagging the transactions by customer so that a customer's entire purchase history is available. Brick-and-mortar retailers who have a loyalty-card program also generally use this approach. However, this approach is generally not useful for restaurants, which typically do not have a loyalty card program. In contrast, embodiments of the invention can make recommendations based solely on the items in a current order, and therefore are usable even when customer-linked transactions are not available.

Similar to with restaurants, embodiments are also particularly useful in the hotel industry, where a customer can be identified by a room number. Customers frequently charge purchases to their hotel room, and therefore it is possible for the hotel to see during a single stay the list of items and services the customer purchased. This list is analogous to the set of items a restaurant customer orders during a single visit, and can be used by embodiments of the invention in an analogous way to produce recommendations of other items and services available at the hotel. At a high-end hotel, the offerings of items and services may be quite numerous, and embodiments can allow the hotel to determine what other items and services it should recommend to a customer.

Further, embodiments are also usable in casino hotels, which generally already have systems in place to track customers' purchases and gambling without even requiring the customer's room number. Casinos typically issue a loyalty card to customers, and currently have systems in place to scan the loyalty card whenever a customer makes a purchase of goods or services or gambles. Embodiments of the invention can work with these systems to produce a recommendation for another product or service at the time the loyalty card is scanned.

In embodiments, a "basket" or "basket of goods" means the set of goods or services that a customer purchased in a single visit to any of these types of establishments (e.g., restaurant, hotel, casino hotel, etc.). For a restaurant, the basket is simply the food and drink items in the order in one embodiment. For a hotel or casino, the basket is the set of goods and services the customer has ordered during a single stay in one embodiment, which may encompass multiple days. Casinos, in addition, may add to the basket what forms of gambling the customer used during a stay.

Further, the "recommendation" in embodiments depends on the particular type of establishment. For restaurants, the recommendation may be an additional food or drink item. For hotels, the recommendation may be any item the hotel sells, including food and drink, plus any services it may offer, such as a spa service or laundry service or room service. For casinos, the recommendation may also include casino-specific goods or services.

Instead of using only pairs of items, embodiments can use the entire basket of items purchased by the customer. For example, embodiments can use characteristics of the entire order, such as how many kids' meals are in the order, to produce its recommendations. For hotels, embodiments can use how much room service the customer ordered together with whether the customer visited the spa. In contrast, known solutions using ARM frequently only consider pairs of items in making a recommendation.

Embodiments can also use demographic attributes of the customer in conjunction with the entire basket. For example, embodiments can use the age of the customer if it is known, and therefore can recommend a different product or service to the customer based on the customer's age even if the basket of items being purchased is the same as is purchased by a different customer.

Therefore, embodiments of the invention have the ability to use some or all of the following features of a customer's purchase:
the individual items in the customer's basket;
the overall characteristics of the entire basket;
demographic attributes of the customer.

Embodiments use algorithms/rules, disclosed in more detail below, for reducing the amount of data required to adapt to changes in offerings or changes in customer preferences. Embodiments generate recommendations based generally on the three features disclosed above, which are most pertinent to restaurants and hotels.

Based on these three features, each basket is classified into one of several different "types." The specific set of features, that is, the specific basket characteristics and the specific demographic attributes, and the different types, are provided as inputs, and are provided by the restaurant or hotel. For example, a very simple set of types could be tiers indicating how much money was spent in the basket, so that the tiers indicate the willingness of the customer to spend at the establishment. Typically, the types will be more complex, and would reflect the customer characteristics that the restaurant or hotel believes are important to its business. For example, the set of types at a restaurant might be whether the order included appetizers, the price tier of the entrée ordered, and whether the order included a kid's meal. Thus, the types would be all combinations of these attributes, so that if there were three tiers of entrées, then in total there would be 2×3×2 types for classifying every order.

The second input used by embodiments is what set of goods or services are to be the targets for recommendation. For example, in a restaurant, the recommendation targets may include all of the appetizers and drinks that the restaurant serves. Typically, a restaurant would want to limit the recommendation targets to specific items, because certain items do not make sense to recommend, such as another entrée. The restaurant may also be interested in driving sales of particular items. Similarly, for hotels, particular goods and services that are recommended can be limited.

Embodiments then proceed to discover from historical data what recommendations from the target set to make for each basket type. Embodiments use rules/algorithms, disclosed in detail below, to reduce the time significantly to generate recommendations by simultaneously discovering recommendations and discovering which types are similar to each other and can thus be combined. A cluster is a set of types which are similar, and because the types are similar, the recommendations for the entire cluster can be the same. Therefore, embodiments effectively reduce the number of types which require different recommendations, and this reduces the amount of data required to discover correct recommendations.

Moreover, the grouping of types into clusters is dynamic, and can adapt to changing offerings and customers and customer preferences. Therefore, as offerings change and customer preferences change, it is possible that two types that were in the same cluster are now in different clusters. Embodiments will dynamically adapt as new purchase data comes in.

In general, for purposes of this disclosure, an "organization" in one embodiment is either a single restaurant chain or single hotel chain. A "location" in one embodiment is a particular hotel within the hotel chain, or a particular restaurant within the restaurant chain. An "item" in one embodiment is either a good or service.

In one embodiment, a "basket" is a set of items purchased by a customer within a single visit. A basket may also have additional data attached to it besides the items purchased, depending on the specific organization. For example, the organization may attach demographic data about the customer to the basket if the organization possesses such data. The term "basket" refers to the set of items purchased PLUS any additional attached data. The attached data is defined by the organization, and embodiments can work with any data defined by the organization as long as it is stored in the appropriate database and properly associated with the basket.

In one embodiment, a "typed basket" refers to what the organization determined to use for the set of types and the type of each basket. A basket with its associated type is a "typed basket". Embodiments do not require any kind of description of the types. Instead, a means of associating a basket with a type label is needed. For example, the type label can simply be an integer, since the invention does not require a description of the types. The associating of baskets with the type labels is performed by the organization in advance to implement embodiments of the invention.

Embodiments of the invention can run independently at each location, using the historical baskets at that particular location, and making recommendations specific to that location.

Figure 2:
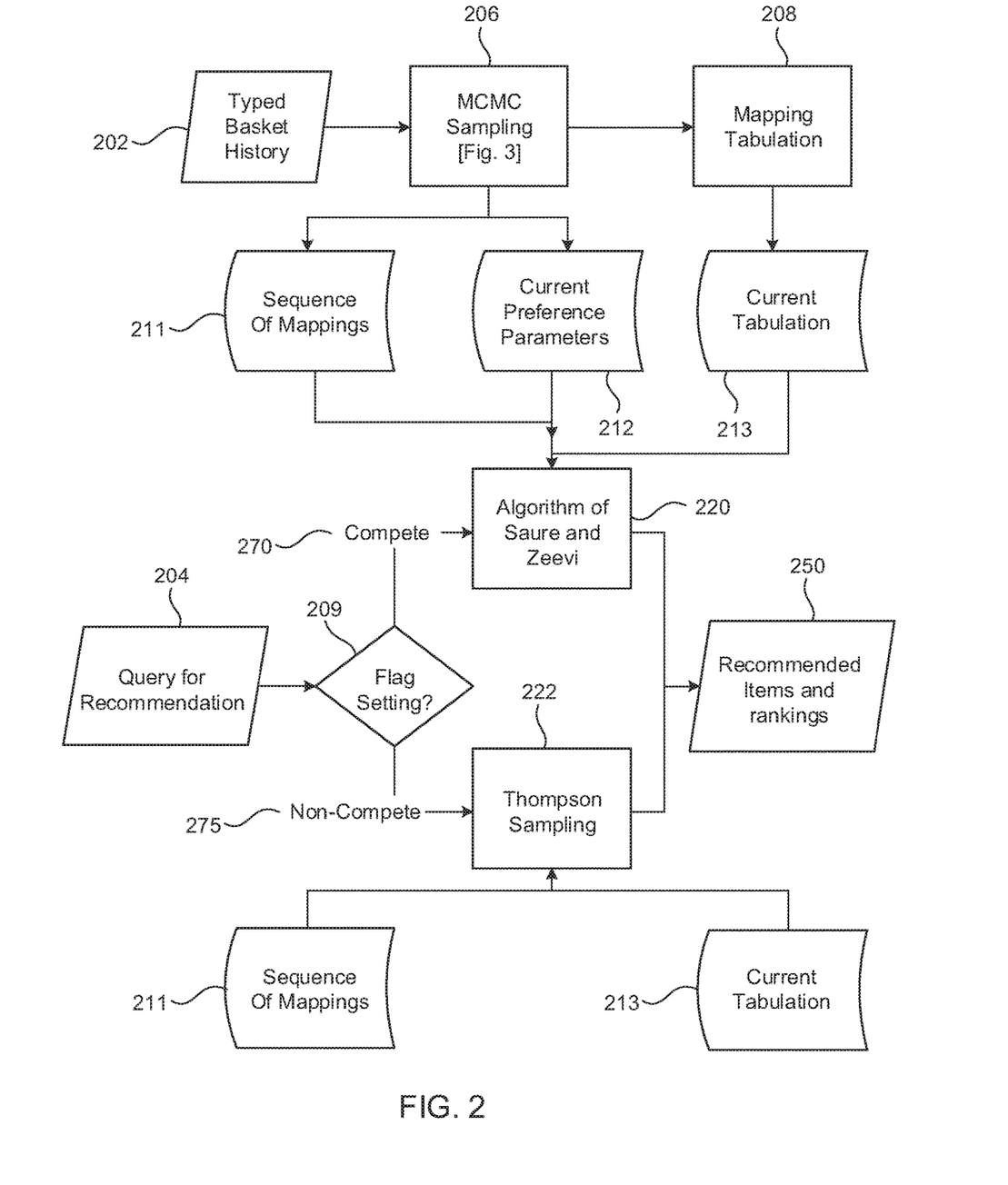
FIGS. 2 and 3 are flow diagrams of the functionality of the recommendation module of FIG. 1 when recommending additional goods and services based on a basket of goods or services in accordance with one embodiment.
Figure 3:
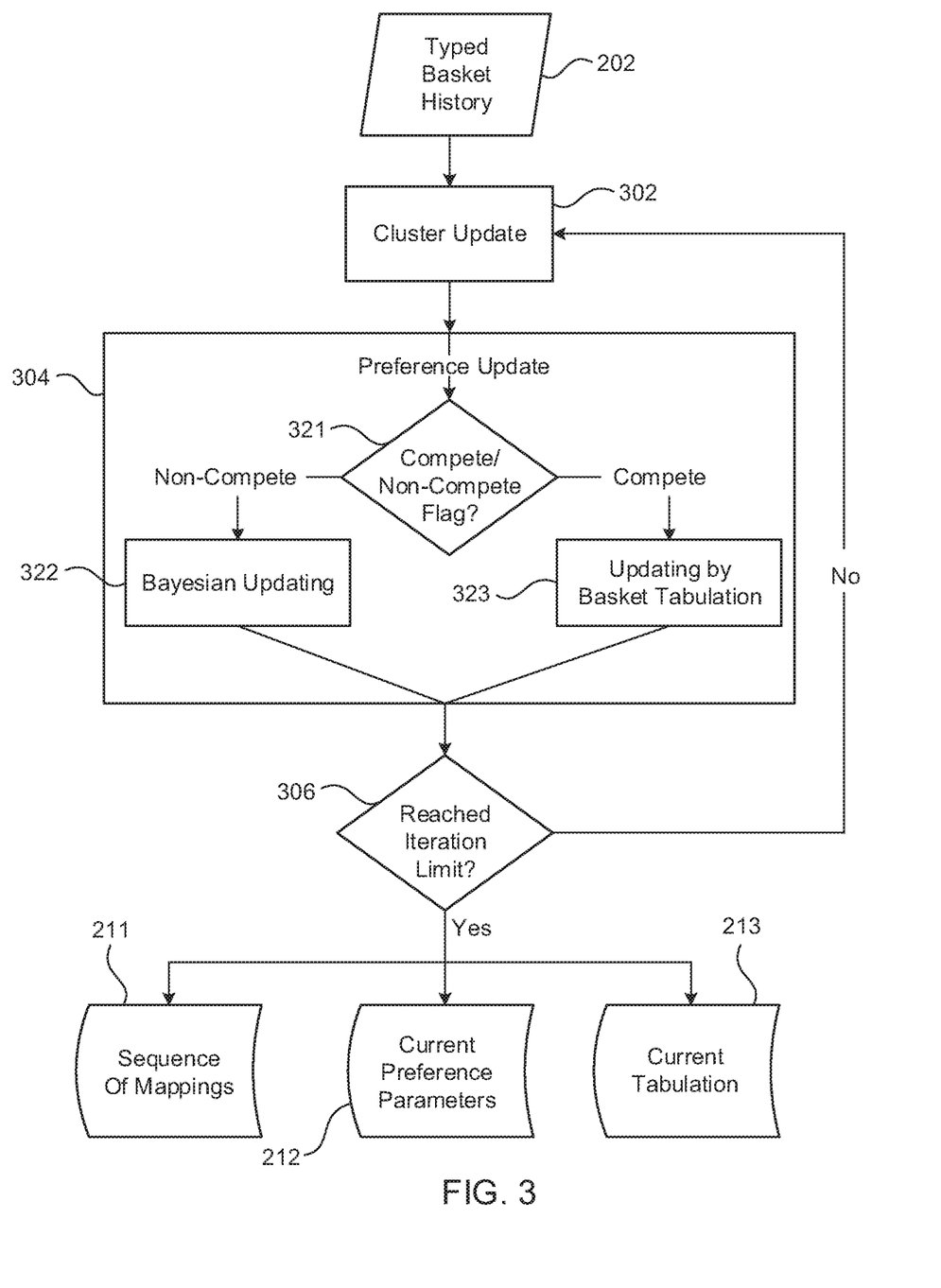

FIGS. 2 and 3 are flow diagrams of the functionality of recommendation module 16 of FIG. 1 when recommending additional goods and services based on a basket of goods or services accordance with one embodiment. FIG. 2 is a flow diagram of the overall process, and FIG. 3 is a flow diagram of the "MCMC" sampling functionality that is part of the functionality of FIG. 2. In one embodiment, the functionality of the flow diagram of FIGS. 2 and 3 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

Before implementing the functionality, embodiments require certain setup inputs/parameters. The setup inputs include "target items", which are the set of items from which embodiments of the invention will produce recommendations. Typically the organization will limit recommendations to be from a particular set of items. For example, at a restaurant, the recommendations may come only from appetizers or side dishes rather than entrées. In the following disclosure, it is assumed that there is a stable set of target items, infrequently changing over time. However, embodiments can also be adapted for use with a changing set of target items.

The setup inputs further includes an identity of "competing" and "non-competing" items, which is implemented as a flag based on the characteristics of the target items. The value of the flag is either "Compete" or "Non-compete" (or true or false, etc.). For example, in the case of restaurants, the flag would typically be set to Compete, because the customer would probably not buy more than one recommended item out of the target set (appetizers and sides). However, in the case of hotels, the flag would probably be set to Non-compete, because the target items are disparate enough that the customer could conceivably purchase more than one, such as purchasing both additional room service and the spa treatment.

Embodiments also receive two types of "real-time input" that can change each time the functionality of FIGS. 2 and 3 is implemented. Each of the inputs is handled by a separate linked algorithm/function: MCMC sampling 206 and mapping tabulation 209. The real-time inputs included a typed basket history 202. Typed basket history 202 in one embodiment is the entire history of baskets (e.g., all of the historical baskets for the last year). This entire history of baskets is used in the processing in the boxes 206, 208, 211, 212, and 213.

Embodiments then perform the functionality of FIG. 2 every time it receives a new typed basket. Specifically, what initiates the functionality 206, 208, 211, 212, and 213 in one embodiment is the presence of a new basket in the historical data, due to a guest completing a stay at the hotel and thus this basket is now historical. In other embodiments, the hotel may wait, for example, two weeks, to pile up multiple new historical baskets, so that 206 is not run just because there is only one new historical basket. Therefore, in embodiments, the hotel may run 206 and the associated boxes every two weeks only. As baskets are completed (i.e., as customers complete their visits) a typed label is attached to each basket. Similarly, for restaurants, a new basket may be generated for each completed customer visit.

Further, functionality of FIG. 2 may be initiated, in addition to processing new historical baskets, by a system at the hotel or restaurant requesting a recommendation at 204. These two initiations are handled by different pieces of the algorithm. In the initiation from 202, historical baskets are being processed, perhaps in batches. In the initiation from 204, the hotel/restaurant is looking for a real-time response, because it is looking to make a recommendation to a guest who has not yet completed their stay at the hotel. In this case, the embodiments generate a recommendation using functionality at 209, 220, 222, and 250.

Another real-time input is a query for recommendation 204 which is when a partial or complete typed basket is received as part of a request for recommendations. After receiving the typed basket in a recommendation query, embodiments respond with a subset of the target items representing the item recommendations generated at 250.

When a new typed historical basket comes in at 202, embodiments perform two functionalities: MCMC sampling at 206 and mapping tabulation at 208. A new typed basket coming in is the trigger for running these two functionalities, but when executed, the entire history of typed baskets that have come in so far at 202 is used, and not just the most recent basket that is the trigger.

Once the functionality is triggered, MCMC sampling 206 is executed using typed basket history 202 as input. A more detailed description of MCMC sampling 206 is shown in FIG. 3. MCMC sampling 206 implements a cluster update 302 and a preference update 304 (in this order) $\eta$ times, where $\eta$ is a tuning parameter that is set once and for all during an initial configuration of embodiments and functions as an iteration limit 306.

Cluster update 302 produces a new mapping from types to clusters. Embodiments determine which types can be merged together into the same cluster because they are similar in their product preferences. The mapping here shows which types are in the same cluster. Cluster update 302 uses the entire history of typed baskets that have come in so far, not just the most recent typed basket. It also uses the results of preference update 304 from the previous iteration.

Preference update 304 generates, for each cluster c found in cluster update 302, a set of "preference parameters" $\mu^{(c)}$. Each $\mu^{(c)}$ is a vector, with an element $\mu_j^{(c)}$ for each target item j. The vector indicates the preference of the cluster for each of the target items. The exact interpretation of the vector depends on the setting of the Compete/Non-compete flag (evaluated at 321), with a different calculation for each setting. If the setting is Non-Compete, then the updating uses Bayesian Updating at 322, disclosed in more detail below. If the setting is Compete, then the functionality uses Updating by Basket Tabulation at 323, disclosed in more detail below.

Therefore, an output of MCMC sampling step 206 is a sequence of $\eta$ mappings 211 and a sequence of $\eta$ preference parameters 212 when a new typed basket is received. The notation for the sequence of mappings is $M_s$ for the mapping produced at iteration s in the loop shown in FIG. 3 (i.e., 302, 304 and 306). Thus, s goes from 1 to $\eta$.

MCMC Sampling

A more detailed description of MCMC sampling 206 that includes cluster update 302 and preference update 304 is as follows. Start with an arbitrary mapping $M_1$ that randomly assigns profiles to clusters and sample the preference parameters from $H_0$ for each cluster. For s=1, ..., $\eta$, repeat the sampling process as follows:

Cluster Update 302: Let $c_i = M_s(i)$ denote the cluster associated with profile i under the mapping $M_s$ and let c denote a generic cluster. For each profile $i \in I$, update the cluster label $c_i$ associated with that customer profile as follows. Let $n_{-i,c}$ be the number of profiles, excluding profile i, that are mapped to an existing cluster c under the mapping $M_s$. Draw a candidate cluster label $c_i^*$ according to the following probability distribution:

$$\mathbb{P}(\text{assign } c_i \text{ to an exisiting cluster } c) = \frac{n_{-i,c}}{I - 1 + \alpha}$$

$$\mathbb{P}(\text{assign } c_i \text{ to a new cluster}) = \frac{\alpha}{I - 1 + \alpha}.$$

If $c_i^* \in \{c_1, \ldots, c_J\}$, then use the corresponding parameter vector $\mu^{c_i*}$. If $c_i^* \notin \{c_1, \ldots, c_J\}$, i.e., if the candidate cluster does not correspond to any of the existing clusters under $M_s$, then $\mu^{c_i*}$ sample from $H_0$.

Set the new value of $c_i$ to $c_i^*$ with probability $$a(c_i^*, c_i) := \min\left\{1, \frac{L(X_i^i, \mu^{c_i^*})}{L(X_i^i, \mu^{c_i})}\right\}$$

and do not change a with probability $1 - a(c^*, c_i)$, where $L(X_i^i, \mu^{c_i})$ denotes the likelihood function given the purchase history $X_i^i$ and the vector of parameters $\mu^{c_i}$. Let $M_{s+1}$ be the updated mapping given by the new assignment of profiles to clusters (i.e., updated $c_i$'s).

Preference Update 304 using Bayesian Updating (322): After MCMC sampling 206, if the flag is set to non-compete at 321, a preference update for non-compete using Bayesian updating at 322 is executed as follows: Update the vector of preference parameters for each cluster: for each $c \in$ $\{c_1, \ldots, c_J\}$, compute the posterior distribution of $\mu^c$ (given the history $X_t$) and draw a new realization for $\mu^c$ from its posterior distribution.

Preference Update 304 using Updating by Basket Tabulation (323): After MCMC sampling 206, if the flag is set to compete at 321, a preference update for compete is executed using updating by basket tabulation at 323. Preference update for compete 323 is as follows: Suppose $M_t$ is the mapping that was just produced in the current Cluster Update 302. Suppose c is one of the clusters produced by $M_t$. The calculation of the element $\mu_j^{(c)}$ for target item j is:

1. Go through the history of all typed baskets that were received at 202. For all the baskets where the type is mapped by $M_t$ to cluster c, count the number of baskets where:
   (a) The basket contains j (the customer purchased target item j).
   (b) The basket contains no target items at all (customer purchased no target item).
2. Form the ratio $v_j^{(c)}$ by dividing a above by b.
3. Take $\mu_j^{(c)} = \ln v_j^{(c)}$.

At 208, embodiments produce the following tabulation of the mappings after completing MCMC sampling 206. In the sequence of generated mappings from the MCMC sampling 206, it is possible that the same mapping is generated more than once. Label the unique mappings as $M_s$, for s=1 . . . L, where L is the number of distinct mappings (here the subscript is simply an indicator of the distinct mapping, as opposed to the earlier use where the subscript indicated the MCMC loop count, so $L \leq \eta$.). Associated with each $M_s$ is the frequency proportion $f_s$, which is the count of the number of times $M_s$ has appeared in the sequence of generated mappings divided by the total number of mappings in the sequence (thus it is always a number between 0 and 1). The $f_s$ is the output of mapping tabulation 208, or current tabulation 217.

When a query is received at 204, embodiments generate recommendations of target items at 250 by using sequence of mappings 211, sequence of preference parameters 212 and mapping tabulation 213 produced by the latest run of MCMC sampling 206 (i.e., as triggered by the last new type basket). Throughout, L is the number of distinct mappings in the latest sequence of mappings, and $f_l$ is the notation for the frequency tabulation of mappings.

Let b be the typed basket received in the query. Embodiments then return a set of target items as recommendations for the customer who purchased b. Denote the type of b as i (i.e., a typed basket consists of both the basket and its type).

Embodiments generate the set of recommendations 250 in a different manner depending on the setting of the Compete/ Non-Compete flag (i.e., at 220 or 222).

For the compete case at 220, embodiments adapt Algorithm 3 disclosed in Saure, D. and Zeevi, A., "Optimal dynamic assortment planning with demand learning", *Manufacturing Service Oper. Management* 15(3), 387-404 (2013), the disclosure of which is hereby incorporated by reference in its entirety (the "Saure" algorithm). The Saure algorithm determines whether to explore or exploit for each arriving customer t, as follows: If all products have been explored at least a number of times (which is of order ln(t)), then the algorithm exploits the current optimal assortment. Otherwise, it offers an assortment containing under-tested products (exploration).

The Saure algorithm assumes a homogeneous population of customers. However, in the Bayesian setup of the dynamic clustering policy, estimates are derived from the approximation to the posterior distribution of the mapping and customer preferences. Therefore, embodiments adapt the Saure algorithm for the dynamic clustering policy.

Embodiments calculate the following to create the required inputs to the Saure algorithm:

1. Exponentiated mean utility $v_j$ for each target item j. Use the following formula, where $v_j^{(M_l(i))}$ is from the Preference Update for Compete disclosed above, and is the $v_j^{(c)}$ calculated from the mapping $M_l$:

$$v_j = \sum_{l=1}^{L} f_l v_j^{(M_l(i))}$$

2. Number of times target item j has been recommended. For the mapping $M_l$ and the cluster $M_l(i)$, calculate the quantity $T_j^{(M_l(i))}$ as the number of times a basket whose type is in $M_l(i)$ received j as a recommendation from embodiments.

3. Average number of times $T_j$ that target item j has been offered. Use this formula:

$$T_j = \sum_{l=1}^{L} f_l T_j^{(M_l(i))}$$

1 and 3 above are then given to the Saure algorithm which outputs the set of recommended target items at 250.

For the non-compete case at 222, embodiments utilize the algorithm disclosed in Thompson, W. R., "On the likelihood that one unknown probability exceeds another in view of the evidence of two samples", *Biometrika* pp. 285-294 (1933), the disclosure of which is hereby incorporated by reference in its entirety ("Thompson Sampling"). For each cluster c that occurs in any mapping, apply Thompson Sampling to the input consisting of the set of all historical typed baskets whose type is in c. Thompson Sampling outputs a number $Q_j^{(c)}$ for each target item j.

As per the notation for mapping tabulation disclosed above, suppose at the time the query for recommendation is received, embodiments have the distinct mappings $M_l$ with frequency proportions $f_l$. Embodiments then calculate for each target item j the number:

$$Q_j = \sum_{l=1}^{L} f_l Q_j^{(M_l(i))}$$

The notation $M_l(i)$ means the cluster to which mapping $M_l$ maps the type i. Embodiments now take the top C target items j that have the largest $Q_j$. This is the set of recommended items 250 to offer to the customer who purchased the typed basket b.

Embodiments can be implemented using a client/server model, where the client can be a POS device 100 of FIG. 1, and the remainder of FIG. 1 functions as a server. The client can display recommendations that are generated at 250 of FIG. 2 to a cashier of a restaurant (e.g., a fast food or quick serve restaurant) or server, who can then suggest those recommendations. The client can also be a device that is directly available to the customers, such as a remote device place on a restaurant table.

Figure 4:
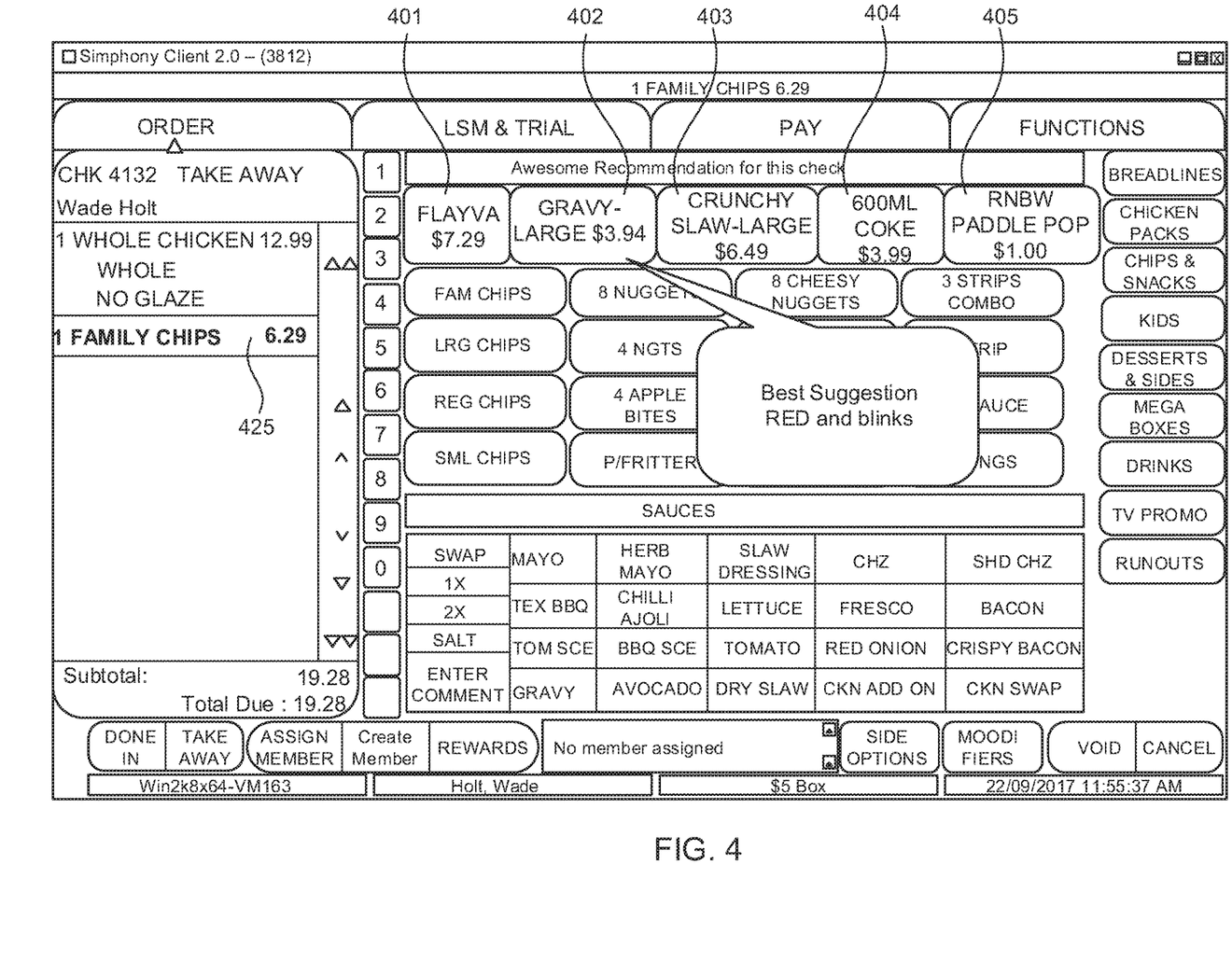
FIGS. 4-6 illustrate screenshots of a UI in accordance to embodiments of the invention.
Figure 5:
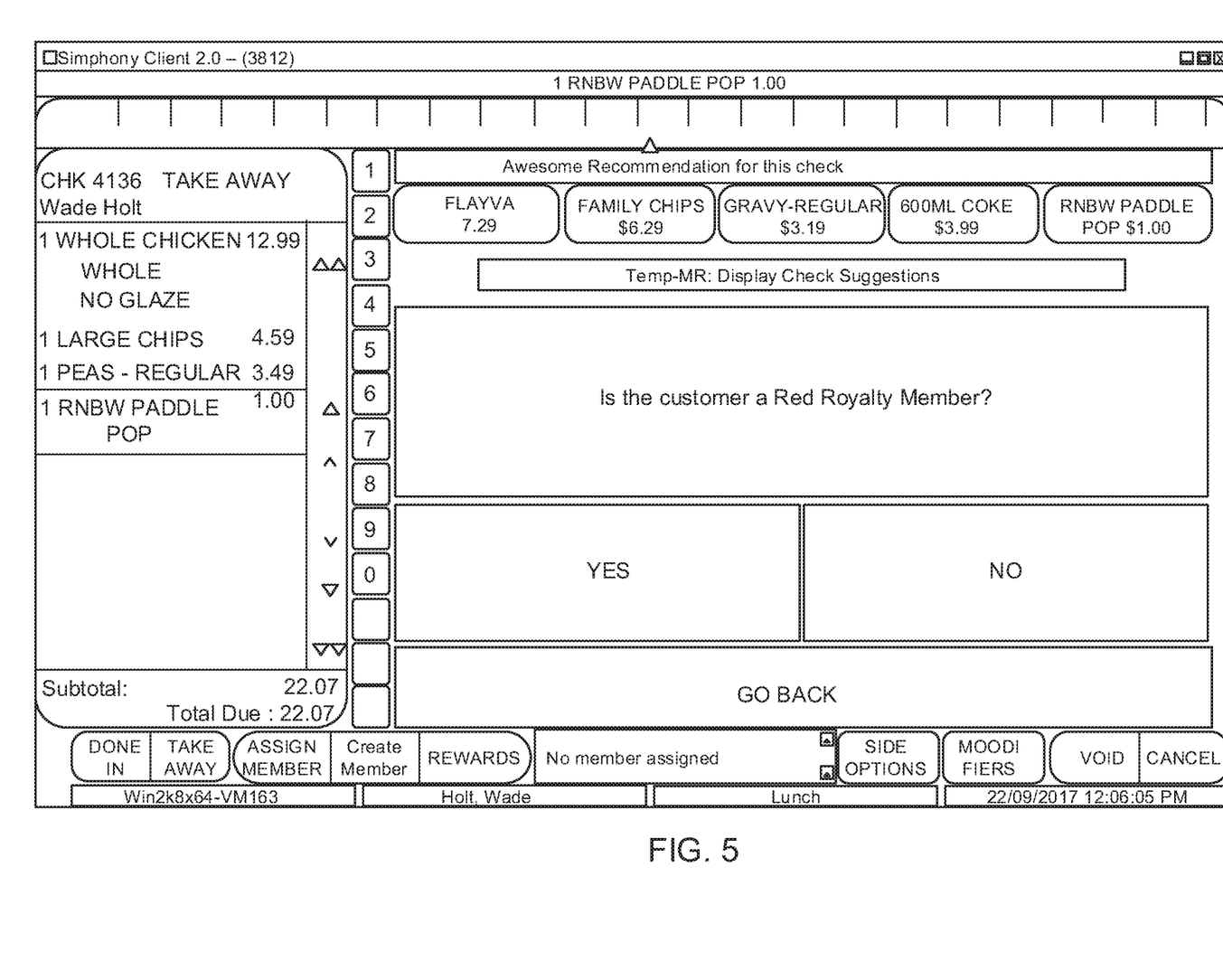
Figure 6:
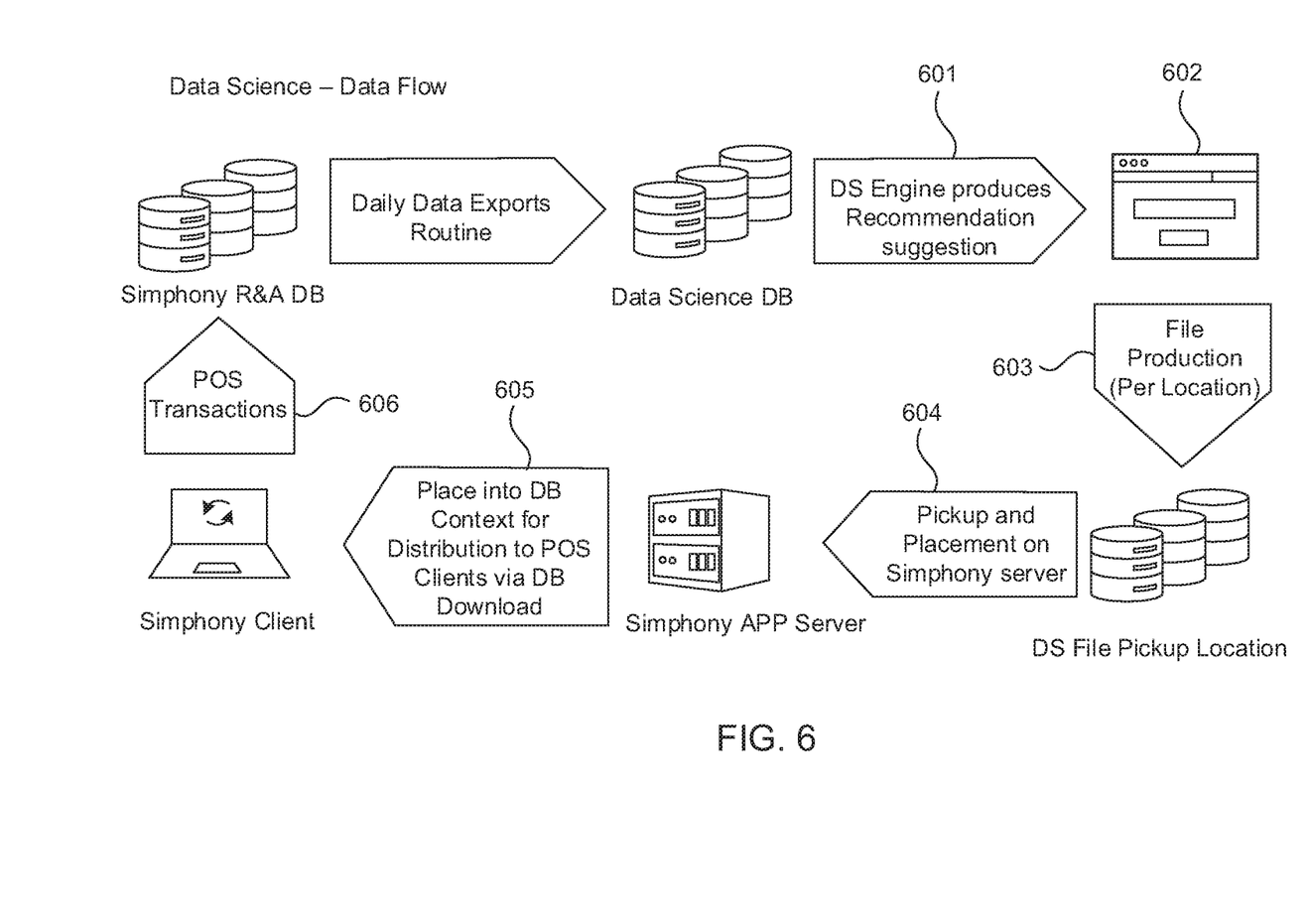

FIGS. 4-6 illustrate screenshots of a UI in accordance to embodiments of the invention. The example shown in FIG.

4 is for a client device configured to support a "quick serve" restaurant, where a customer places an order with the cashier and then waits for the order to be assembled. The client device that implements the invention and provides the inventive functionality is a specialized device.

FIG. 4 illustrates five recommendations 401-405 that are generated in response to the basket of goods 425 that form the current order. Out of the five recommendations, a top recommendation 402 is shown in red and blinking. Embodiments generate these recommendations by taking the five items with the highest purchase probabilities that is calculated based on the other items already in the order. The ranking functionality is performed at 250

FIG. 5 illustrates how and where a cashier can enter the customer's loyalty number if the customer has one, and the invention can then use any demographic information associated with the loyalty card to modify the recommendations. The demographic information can be associated with the definitions of the type of baskets. The cashier should then ask the customer whether he or she wants the top item added to the order (but has the flexibility to also recommend the other four items). Some embodiments then prompt the cashier to verify whether the recommendation was given to the customer.

FIG. 6 illustrates a high-level systems diagram in accordance with embodiments of the invention. "Data Science" or "DS" engine refers to embodiments, including system 10, that generate recommendation suggestions. At 601, the DS engine produces a list of types, the mapping of types to clusters, and the purchase probabilities associated with each cluster. In a Portal 602, a user can review this output, and make manual alterations as desired. Then, at 603, a file containing this information is produced, per store. Embodiments determine separate recommendations for each store, thus allowing for regional differences in customer tastes. These per-store files are then loaded into a "Simphony" server at 604, which then distributes the files to the point-of-sale systems (i.e., the hardware that the cashier actually uses) at 605. The point-of-sale systems then record sales transactions at 606, which are then uploaded back to the Symphony server. Embodiments then use these latest sales results to update its purchase probabilities and also its mapping of types to clusters.

Example Use Case of Embodiments of the Invention for Hotels

For an example use case, assume a high-end hotel chain with a loyalty-card program, and that the hotel has some demographic information about its customers, such as age. Assume the hotel has defined the following set of types based on the following characteristics:

The age bracket of the one who booked the room: 20-30, 30-40, 40-50, 50-60, 60+.
The number of people in the guest party: 1, 2, 3, 4+.
Whether the guest party has children
The price tier of the room the guest booked: High, Medium, Low.

Each combination or set of values for these characteristics forms one type. An example type is: Age 30-40; 2 guests; no children; Low.

The total number of types is 5×4×2×3=120. The aim of embodiments of the invention is to determine which of these 120 types can be combined together because the preferences of the types for the ancillary offerings are similar enough. The example characteristics here shows that the invention is flexible enough for the hotel to use any characteristics for the types as long as the hotel has a way of determining the characteristics for its guests.

For simplicity of this example, the characteristics do not include characteristics of the basket of ancillary items that the customer might have already purchased during the visit, and in fact the basket in this example consists just of the room that the guest has booked. However, in a real implementation, the characteristics would likely include some indication of what ancillary items the guest has already purchased during this stay, such as whether the basket already includes a spa treatment (meaning the guest already purchased it during this stay).

The specific ancillary offerings include:
1. Spa treatment;
2. Gym services;
3. Mini-bar items;
4. Room service.

These are the set of "target items" that are provided as inputs. The "basket" for this example is just the set of ancillary items already purchased by the guest during this particular visit.

Lastly, the Non-Compete flag is set at 209, because these ancillary items could all be purchased together (i.e., they are not substitutes for one another and in fact the typical customer might purchase more than one in a single visit).

Notation

There are 4 items in the target offerings of the example (see above), and thus the vectors $\mu$ referred to above are vectors of length 4 giving the purchase probabilities of each of the 4 items in the target set. Each element of $\mu$ is a number between 0 and 1. Note that because the Non-Compete flag is set, the sum of the elements can be anything, including bigger than 1. Each element represents a probability of purchase independent of the others, meaning the customer decides on each one separately. If the Compete flag were set instead, this would not be true, and the purchase probabilities are not independent and in fact must sum to something less than 1.

Handling a New Historical Basket

As disclosed in the text, embodiments continually receives historical baskets at 202 as guests complete their stays. Upon receipt of these new historical baskets, embodiments run MCMC Sampling 206 to process the baskets.

The MCMC Sampling 206 is a loop that runs $\eta$ times. Each iteration generates a table such as the following Table 1:

TABLE 1

| | Mapping A | | | | | | | | |
|---|---|---|---|---|---|---|---|---|---|
| Row | Age bracket | Guest count | Children? | Price tier | Cluster | $\mu[1]$ | $\mu[2]$ | $\mu[3]$ | $\mu[4]$ |
| 1 | 40-50 | 2 | no | high | 1 | 0.4 | 0.1 | 0.3 | 0.4 |
| 2 | 40-50 | 3 | yes | medium | 2 | 0.1 | 0.2 | 0.3 | 0.25 |

TABLE 1-continued

Mapping A

| Row | Age bracket | Guest count | Children? | Price tier | Cluster | μ[1] | μ[2] | μ[3] | μ[4] |
|-----|-------------|-------------|-----------|------------|---------|------|------|------|------|
| 3 | 40-50 | 4 | yes | medium | 2 | | | | |
| 4 | 40-50 | 4 | yes | high | 2 | | | | |
| 5 | 40-50 | 4 | yes | low | 3 | 0.1 | 0.15 | 0.3 | 0.2 |
| 6 | ... | | | | 4 | | | | |
| ... | | | | | | | | | |
| 120 | ... | | | | | | | | |

Only a portion of the table is shown above. In an actual system, the table would contain a row for each combination of the basket characteristics (thus 120 rows in all). The "Cluster" column gives the mapping of types to clusters, and thus 3 of the types shown above are assigned to the same cluster, indicating in this particular mapping the 3 types are treated as having the same preference parameters. The columns labelled 1 through 4 give the preference parameters (referred to as μ above) for each target item, expressed as a purchase probability. There is one set of preference parameters for each cluster, since a cluster by definition has the same preference parameters for all its constituent types.

Note how the sum of the preference parameters for Cluster 1 sums to more than 1. Again, this is because the Non-Compete flag is set.

Assume that table 1 above was produced by MCMC Sampling 206 in iteration s of the loop (after s times through the loop). Now, for iteration s+1, table 1 from iteration s is used and the following steps produce a new table:
1. (Cluster Update 302) Possibly make changes in the assignments of the types to the clusters.
2. (Preference Update 304) Generate new preference parameters for each cluster, using the latest set of historical baskets and any new assignments made in Cluster Update.

Possibly Make Changes

This is a multi-step procedure, executed for each row of the current table. For example, assume the procedure for the row 3 of the table is being executed. The system has already produced a candidate cluster to possibly switch row 3 to, namely Cluster 3 (row 3 is currently in cluster 2 in the above table). Embodiments now execute the following to determine whether to actually switch row 3 to cluster 3:
1. Calculate a "likelihood" score, for row 3 assigned to its current cluster, 2; take each historical basket that is of the type indicated in row 3, and keep a running multiplication of the purchase probabilities indicated in the above table for each historical purchase of an ancillary offering. For example, if a historical basket had a purchase of Spa Treatment, multiply in a 0.1, since 0.1 is the purchase probability in Cluster 2 for Spa. If a historical basket had both a Spa and a mini bar, multiply in a 0.1 and a 0.3. Do this for all historical baskets of the type indicated in row 3.
2. Calculate a second "likelihood" score, for row 3 switched to cluster 3, by the same running multiplication except now using the purchase probabilities listed for cluster 3 instead of the ones for cluster 2.
3. Divide the likelihood score in 2 by the likelihood score in 1. If the ratio is above 1, switch Row 3 to cluster 3. If the ratio is below 1, switch Row 3 to cluster 3 with probability equal to the ratio.

The likelihood scores are a measurement of how well the purchase probabilities of each cluster fit the actual purchase history. Thus, the above switches Row 3 to Cluster 3 if Cluster 3 describes the purchases better than Cluster 2. In this way, embodiments can consolidate different rows into the same cluster, which is one the basic points of the invention.

The above steps are executed for every row of the above table to produce a new table, Table 2, a portion of which is shown here:

TABLE 2

Mapping B

| Row | Age bracket | Guest count | Children? | Price tier | Cluster | μ[1] | μ[2] | μ[3] | μ[4] |
|-----|-------------|-------------|-----------|------------|---------|------|------|------|------|
| 1 | 40-50 | 2 | no | high | 1 | | | | |
| 2 | 40-50 | 3 | yes | medium | 2 | | | | |
| 3 | 40-50 | 4 | yes | medium | 3 | | | | |
| 4 | 40-50 | 4 | yes | high | 2 | | | | |
| 5 | 40-50 | 4 | yes | low | 3 | | | | |
| 6 | ... | | | | 4 | | | | |
| ... | | | | | | | | | |
| 120 | ... | | | | | | | | |

In this example, the Row 3 type has switched to Cluster 3 from Cluster 2, and thus Cluster 3 now consists of both of the types in Row 3 and Row 5, while Cluster 2 now consists only of the types in Rows 2 and 4.

Generate New Preference Parameters for Each Cluster

Note in the above new table 2 the preference parameters are empty. Next, Preference Update 304 is executed for each cluster to fill in the preference parameters for the cluster. Assume Cluster 2 is being processed, which consists of rows 2 and 4:
1. Find all historical baskets that fit the type of any row in the cluster, which would be either row 2 or row 4. Assume there are 1,000 of them.

2. Out of the 1,000, find the fraction that purchased each of the ancillary items. For example, item 1=0.1, item 2=0.15, item 3=0.3, and item 4=0.23.
3. These values can now be used for the preference parameters, that is, $\mu[1]=0.1$, $\mu[2]=0.15$. etc. However, this would not account for uncertainty in these values, meaning these are only approximations to the true values since there is always randomness in the behavior of past customers. Embodiments account for uncertainty through the use of equations (4a), (4b), and (4c) of Saure, D. and Zeevi, A., "Optimal dynamic assortment planning with demand learning", *Manufacturing Service Oper. Management* 15(3), 387-404 (2013) ("Saure"). The Bayesian methodology, a standard approach, is applied using these equations and the resulting $\mu$ values will be slightly altered, say for example to 0.15, 0.16, 0.32, and 0.28 from those above. Applying this methodology also allows the hotel operator to apply previous experience and specify what the methodology calls a "prior," meaning a belief about what the overall average values of $\mu$ are. In this case, because the hotel operator may have specified a prior of 0.2, 0.2, 0.4, 0.4, the Bayesian algorithm has increased slightly the values for $\mu$. The prior is denoted by $H_0$ in Saure, and is used in equation (4c) as the input to the standard Bayesian approach.

This completes the current iteration of MCMC Sampling 206, and now MCMC Sampling 206 moves on to the next iteration, using the just-completed table as input for the next iteration. As disclosed above, each iteration builds its table using the table from the previous iteration, using both the clusters and the preference parameters of the previous table. Therefore, at completion, MCMC Sampling 206 has produced $\eta$ such tables, one in each iteration.

Mapping Tabulation Step

After the MCMC Sampling has run through all $\eta$ iterations, Mapping Tabulation 208 extracts just the cluster mapping from the tables produced by MCMC Sampling 206 (ignoring the preference parameters), and:
Determines the distinct mappings (it is possible that the same mapping was produced in more than one iteration of MCMC Sampling). The number of distinct mappings is at most $\eta$.
Counts up the number of mappings for each distinct one.
Generate frequency proportions for each distinct mapping
Assume MCMC Sampling 206 produced 10 distinct mappings in the example, with $\eta=110$. Mapping tabulation produces a table such as the following Table 3:

TABLE 3

|  | Count | Frequency proportion |
| --- | --- | --- |
| Mapping A | 9 | 9/110 = 0.081 |
| Mapping B | 11 | 11/110 = 0.1 |
| (8 more mappings) |  |  |

Producing multiple mappings instead of a single one reflects the uncertainty regarding what the mapping truly is. The frequency proportions can be interpreted as probabilities, and thus there is a 8.1 percent chance that the true mapping is Mapping A, and a 10% chance it is Mapping B. Handling uncertainty in this way is a key novel feature of embodiments.

Query for Recommendation

As disclosed, embodiments can respond to queries for recommendations at 204. Embodiments are given a basket and its type, and then respond with recommendations at 250 of which ancillary item or items to recommend to the guest.

Assume that the basket given is of the type given in Row 3 of the above mapping tables. If it were absolutely certain which cluster a type belonged to, then it would be sufficient to simply run standard algorithms disclosed in Saure on whatever cluster Row 3 belonged to and obtain a recommendation that way. However, as disclosed above, a key feature of the invention is handling the uncertainty of which mapping is the true mapping. Thus, it is necessary to combine the multiple mappings with the standard algorithms.

Because the Non-Compete flag is set in this example, responding to the query for recommendations employs a standard algorithm referred to as Thompson Sampling at 222. To simplify this example, only the following two mappings disclosed above are used: Mapping A and Mapping B. Consider Mapping A. Thompson Sampling gives numbers $A_j^{(c)}$ for each cluster c in the Mapping A and each ancillary item j. Thompson Sampling is also run on Mapping B, to give numbers $B_j^{(c)}$ for each cluster c in the Mapping B and each ancillary item j. These numbers are all labeled Q above, but for clarity they will be labeled with the mapping from which they came.)

If there was only one mapping, such as Mapping A, then the recommendations are obtained by using the numbers $A_1^{(2)}, A_2^{(2)}, A_3^{(2)}, A_4^{(2)}$, because Mapping A puts Row 3 in Cluster 2. The highest numbers among these 4 are picked and the associated ancillary items are recommended. For example, if the hotel wants to make just a single recommendation, the highest number among the four is picked.

However, since there are multiple mappings, both Mapping A and Mapping B are accounted for by combining their effects:

$$Q_j = 0.081 A_j^{(2)} + 0.1 B_j^{(3)} + \ldots$$

The 0.081 is the frequency proportion of Mapping A, and 0.1 is the frequency proportion of Mapping B. Note that Mapping B assigns Row 3 to Cluster 3, and thus the superscript becomes cluster 3 instead of cluster 2. The ellipses denote the contribution of the other mappings, each multiplied by the corresponding frequency proportion. In other words, the final $Q_j$ is a weighted average, with the weights being the frequency proportions of the mappings. In this way, embodiments takes an average across all mappings according to the strength with which the mapping is likely to be the true mapping. Then, to obtain the recommendation, the ancillary items associated with the highest $Q_j$ are selected.

As disclosed, embodiments make recommendations on the basis of two criteria:
1. What items are most likely to be acceptable to customers.
2. What items have not yet been frequently recommended to customers.

It may be assumes that doing 1 alone is sufficient, but in this case, it is possible because of randomness in the data or insufficient data that an item that customers would in fact be quite receptive to is never recommended. Thus, embodiments "take a risk" from time to time and recommend an item using criterion 2 instead of always using 1. Thus, embodiments balance "exploitation" (criterion 1) vs. "exploration" (criterion 2).

The hotel can select the number of recommendations to be received from the query for recommendation. Typically, it may want only 1 recommendation, in which case the ancillary item with the highest Q score is selected, but embodiments are configurable to select more if the hotel desires them.

After the hotel receives the recommendation at 250, the recommendation may be used by other specialized computer systems to provide further functionality. For example:

1. The recommendation may appear on the point of sale systems that the hotel has when the guest makes a purchase and gives a room number. The user of the point of sale system then makes the recommendation verbally to the guest. The recommendation may be accompanied by a small discount.
2. The recommendation may be sent in email to the guest, again possibly along with a small discount.
3. The recommendation may be promised to the guest on the guest's next stay at the hotel, as an inducement to choose to stay at the hotel again.

As disclosed, embodiments makes recommendations for additional products and services based on what a customer has purchased so far, and is particularly suited for restaurants and hotels due to frequently changing menus of items and services. Known systems other than ARM may already use the entire basket of items or demographic attributes to make recommendations, but because the number of different types of baskets can be quite large, such a system may require large amounts of historical basket information before making new recommendations, which slows the rate at which the system can adapt its recommendations to changes in offerings or customer preferences. The problem becomes even worse when demographic attributes are added.

In contrast to known systems, embodiments rely on a reduction in the amount of new data that must come in before adapting to changing offerings or changing customer preferences. Therefore, embodiments makes it practical to produce recommendations based on only at most three of features of a customer's purchase: (1) the individual items in the customer's basket; (2) the overall characteristics of the entire basket; or (3) demographic attributes of the customer. Embodiments can adapt its recommendations faster than known systems to new data, which is important in industries where offerings and customer preferences change continuously.

Further, since restaurants typically do not have loyalty programs, recommendation systems for restaurants cannot require customer-linked transactions. Known ARM based recommendation systems do not require customer-linked transactions, but are typically limited in considering only pairs of items, and do not consider basket properties or demographic attributes. In contrast, embodiments do not require customer linked transactions, and can consider both basket properties and demographic attributes. The ability to include demographic properties is significant in the hotel and restaurant industries, which are interested in customized treatment of their clientele.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A method, implemented by one or more processors, of providing a recommendation for one or more additional items in response to receiving a basket of goods, the method comprising:
    determining a type for the basket of goods from a predefined set of basket types, wherein the basket of goods comprises a set of items purchased by a customer during a single visit to a restaurant or a hotel;
    receiving a set of additional targeted items as target recommendations, wherein that recommended additional item is one of the targeted items of the set of additional targeted items;
    receiving a history of previously received basket types comprising a plurality of different basket types;
    iteratively performing, until an iteration limit is reached, a dynamic cluster update followed by a preference update, the dynamic cluster update comprising dynamically clustering each of the plurality of basket types into one or more clusters to generate a mapping, the dynamic cluster update based on the history of previously received basket types and the preference update, and the preference update comprising generating, for each of the clusters from the dynamic cluster update, a set of preference parameters comprising a vector indicating a preference of the cluster for each of the targeted items;
    outputting a sequence of mappings and a sequence of preference parameters in response to reaching the iteration limit;
    generating a frequency of tabulation of mappings from the sequence of mappings;
    generating the recommendation based on the sequence of mappings, the sequence of preference parameters and the frequency of tabulation of mappings, the recommendation comprising the one or more additional items, the recommendation comprising a specialized recommendation file comprising a listing of basket types, a mapping of basket types to clusters, and purchase probabilities associated with each cluster;
    transmitting the specialized recommendation file to a point-of-sale system, the point-of-sale system adapted to provide the recommendation for the one or more additional items using the specialized recommendation file in conjunction with a new sales transaction; and
    receiving the new sales transaction from the point-of-sale system comprising a new received basket type and then repeating the iteratively performing the dynamic cluster update to dynamically revise the mapping of at least one of the basket types into at least one different cluster based on the history of previously received basket types and the new received basket type, and repeating the generating the recommendation based on the sequence of mappings.

2. The method of claim 1, wherein when the set of additional targeted items is flagged as competitive, the generating the recommendation comprises determining whether to explore or exploit for each arriving customer t, comprising if all items have been explored at least a number of times related to ln(t), then exploit a current optimal assortment, otherwise offer an assortment including undertested products.

3. The method of claim 1, wherein the set of additional targeted items is flagged as non-competitive, and the generating the recommendation comprises executing Thompson Sampling.

4. The method of claim 1, wherein the set of items comprises goods purchased during the single visit to the restaurant, or goods and services during and services during the single visit to the hotel.

5. The method of claim 1, wherein the type of the basket of goods is determined based on features comprising individual items in the basket of goods, overall characteristics of the basket of goods, and demographic attributes of the customer.

6. The method of claim 1, wherein the preference updating comprises Bayesian Updating when the set of additional targeted items is flagged as non-competitive and the preference updating comprises updating by basket tabulation when the set of additional targeted items is flagged as competitive.

7. The method of claim 1, wherein the dynamic clustering comprises:

denoting a generic cluster c and having $c_i = M_s(i)$ denoting the cluster associated with profile i under the mapping $M_s$;

for each profile $i \in I$, updating the cluster label $c_i$ associated with that customer profile by letting $n_{-i,c}$ be a number of profiles, excluding profile i, that are mapped to an existing cluster c under the mapping $M_s$ and drawing a candidate cluster label $c_i^*$ according to a probability distribution;

if $c_i^* \in \{c_1, \ldots, c_J\}$, then use the corresponding parameter vector $\mu^{c_i*}$;

if $c_i^* \notin \{c_1, \ldots, c_J\}$, set a new value of $c_i$ to $c_i^*$.

8. A non-transitory computer readable medium having instructions stored thereon that, when executed by a processor, cause the processor to provide a recommendation for one or more additional items in response to receiving a basket of goods, the providing the recommendation comprising:

determining a type for the basket of goods from a predefined set of basket types, wherein the basket of goods comprises a set of items purchased by a customer during a single visit to a restaurant or a hotel;

receiving a set of additional targeted items as target recommendations, wherein that recommended additional item is one of the targeted items of the set of additional targeted items;

receiving a history of previously received basket types comprising a plurality of different basket types;

iteratively performing, until an iteration limit is reached, a dynamic cluster update followed by a preference update, the dynamic cluster update comprising dynamically clustering each of the plurality of basket types into one or more clusters to generate a mapping, the dynamic cluster update based on the history of previously received basket types and the preference update, and the preference update comprising generating, for each of the clusters from the dynamic cluster update, a set of preference parameters comprising a vector indicating a preference of the cluster for each of the targeted items;

outputting a sequence of mappings and a sequence of preference parameters in response to reaching the iteration limit;

generating a frequency of tabulation of mappings from the sequence of mappings;

generating the recommendation based on the sequence of mappings, the sequence of preference parameters and the frequency of tabulation of mappings, the recommendation comprising the one or more additional items, the recommendation comprising a specialized recommendation file comprising a listing of basket types, a mapping of basket types to clusters, and purchase probabilities associated with each cluster;

transmitting the specialized recommendation file to a point-of-sale system, the point-of-sale system adapted to provide the recommendation for the one or more additional items using the specialized recommendation file in conjunction with a new sales transaction; and receiving the new sales transaction from the point-of-sale system comprising a new received basket type and then repeating the iteratively performing the dynamic cluster update to dynamically revise the mapping of at least one of the basket types into at least one different cluster based on the history of previously received basket types and the new received basket type, and repeating the generating the recommendation based on the sequence of mappings.

9. The computer readable medium of claim 8, wherein when the set of additional targeted items is flagged as competitive, the generating the recommendation comprises determining whether to explore or exploit for each arriving customer t, comprising if all items have been explored at least a number of times related to $\ln(t)$, then exploit a current optimal assortment, otherwise offer an assortment including under-tested products.

10. The computer readable medium of claim 8, wherein the set of additional targeted items is flagged as non-competitive, and the generating the recommendation comprises executing Thompson Sampling.

11. The computer readable medium of claim 8, wherein the set of items comprises goods purchased during the single visit to the restaurant, or goods and services during and services during the single visit to the hotel.

12. The computer readable medium of claim 8, wherein the type of the basket of goods is determined based on features comprising individual items in the basket of goods, overall characteristics of the basket of goods, and demographic attributes of the customer.

13. The computer readable medium of claim 8, wherein the preference updating comprises Bayesian Updating when the set of additional targeted items is flagged as non-competitive and the preference updating comprises updating by basket tabulation when the set of additional targeted items is flagged as competitive.

14. The computer readable medium of claim 8, wherein the dynamic clustering comprises:

denoting a generic cluster c and having $c_i = M_s(i)$ denoting the cluster associated with profile i under the mapping $M_s$;

for each profile $i \in I$, updating the cluster label $c_i$ associated with that customer profile by letting $n_{-i,c}$ be a number of profiles, excluding profile i, that are mapped to an existing cluster c under the mapping $M_s$ and drawing a candidate cluster label $c_i^*$ according to a probability distribution;

if $c_i^* \in \{c_1, \ldots, c_J\}$, then use the corresponding parameter vector $\mu^{c_i*}$;

if $c_i^* \notin \{c_1, \ldots, c_J\}$, set a new value of $c_i$ to $c_i^*$.

15. A recommendation system comprising:

one or more processors coupled to a storage device that stores instruction, the processors executing the instructions to provide a recommendation for one or more additional items in response to receiving a basket of goods;

the processors determining a type for the basket of goods from a predefined set of basket types, wherein the basket of goods comprises a set of items purchased by a customer during a single visit to a restaurant or a hotel, receiving a set of additional targeted items as target recommendations, wherein that recommended additional item is one of the targeted items of the set of additional targeted items, and receiving a history of previously received basket types comprising a plurality of different basket types;

the processors iteratively performing, until an iteration limit is reached, a dynamic cluster update followed by a preference update, the dynamic cluster update comprising dynamically clustering each of the plurality of basket types into one or more clusters to generate a mapping, the dynamic cluster update based on the history of previously received basket types and the preference update, and the preference update comprising generating, for each of the clusters from the dynamic cluster update, a set of preference parameters comprising a vector indicating a preference of the cluster for each of the targeted items and outputting a sequence of mappings and a sequence of preference parameters in response to reaching the iteration limit;

the processors generating a frequency of tabulation of mappings from the sequence of mappings and generating the recommendation based on the sequence of mappings, the sequence of preference parameters and the frequency of tabulation of mappings, the recommendation comprising the one or more additional items, the recommendation comprising a specialized recommendation file comprising a listing of basket types, a mapping of basket types to clusters, and purchase probabilities associated with each cluster;

the processors transmitting the specialized recommendation file to a point-of-sale system, the point-of-sale system adapted to provide the recommendation for the one or more additional items using the specialized recommendation file in conjunction with a new sales transaction; and the processors receiving the new sales transaction from the point-of-sale system comprising a new received basket type and then repeating the iteratively performing the dynamic cluster update to dynamically revise the mapping of at least one of the basket types into at least one different cluster based on the history of previously received basket types and the new received basket type, and repeating the generating the recommendation based on the sequence of mappings.

16. The recommendation system of claim 15, wherein when the set of additional targeted items is flagged as competitive, the generating the recommendation comprises determining whether to explore or exploit for each arriving customer t, comprising if all items have been explored at least a number of times related to ln(t), then exploit a current optimal assortment, otherwise offer an assortment including under-tested products.

17. The recommendation system of claim 15, wherein the set of additional targeted items is flagged as non-competitive, and the generating the recommendation comprises executing Thompson Sampling.

18. The recommendation system of claim 15, wherein the set of items comprises goods purchased during the single visit to the restaurant, or goods and services during and services during the single visit to the hotel.

19. The recommendation system of claim 15, wherein the type of the basket of goods is determined based on features comprising individual items in the basket of goods, overall characteristics of the basket of goods, and demographic attributes of the customer.

20. The recommendation system of claim 15, wherein the preference updating comprises Bayesian Updating when the set of additional targeted items is flagged as non-competitive and updating by basket tabulation when the set of additional targeted items is flagged as competitive.

* * * * *